3 Sheets—Sheet 1.
T. H. RUSSELL.
WELDING IRON TUBES.
No. 4,992. Patented Mar. 6, 1847.
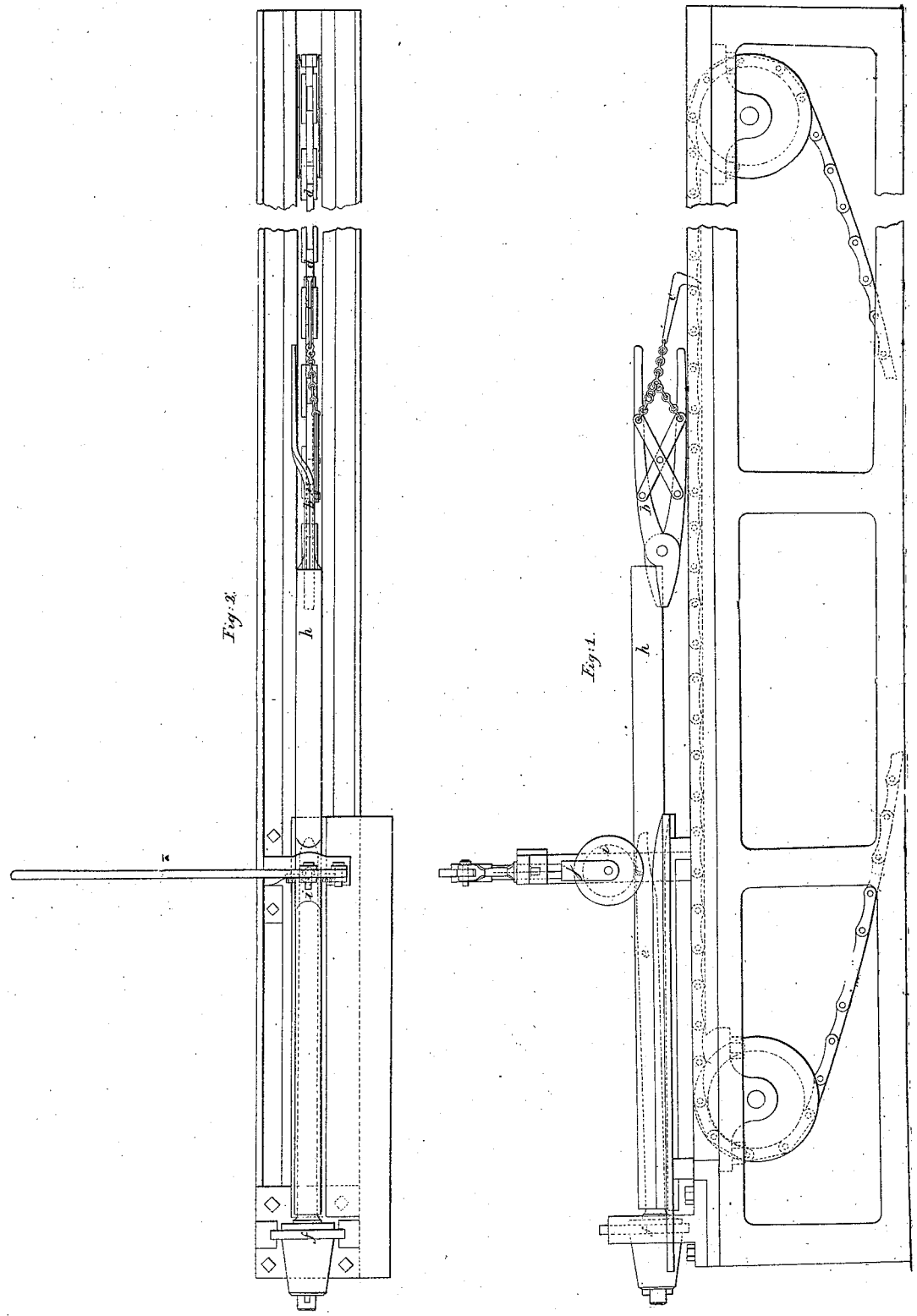

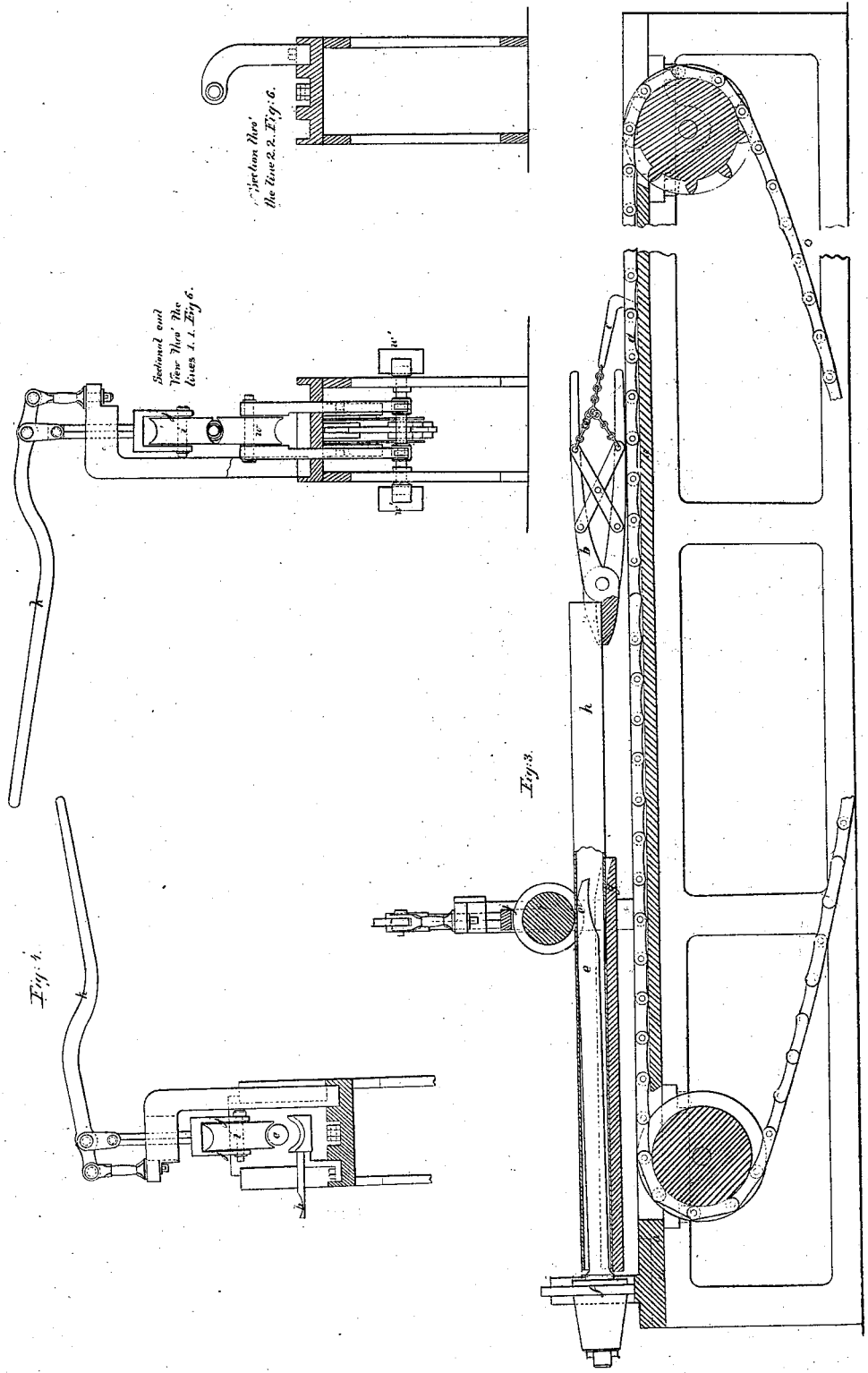
T. H. RUSSELL.
WELDING IRON TUBES.
No. 4,992. Patented Mar. 6, 1847.

T. H. RUSSELL.
WELDING IRON TUBES.
No. 4,992.  Patented Mar. 6, 1847.
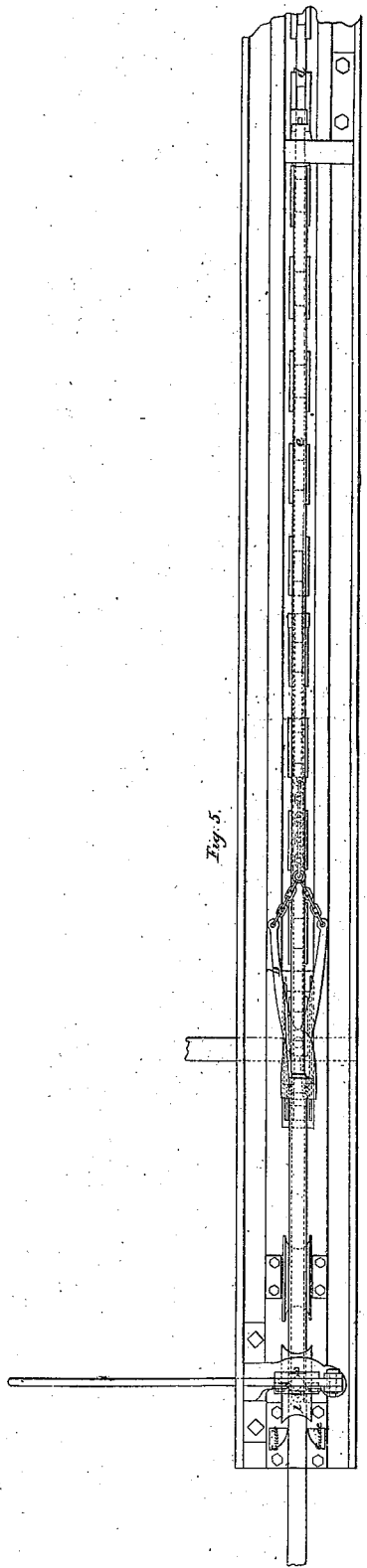
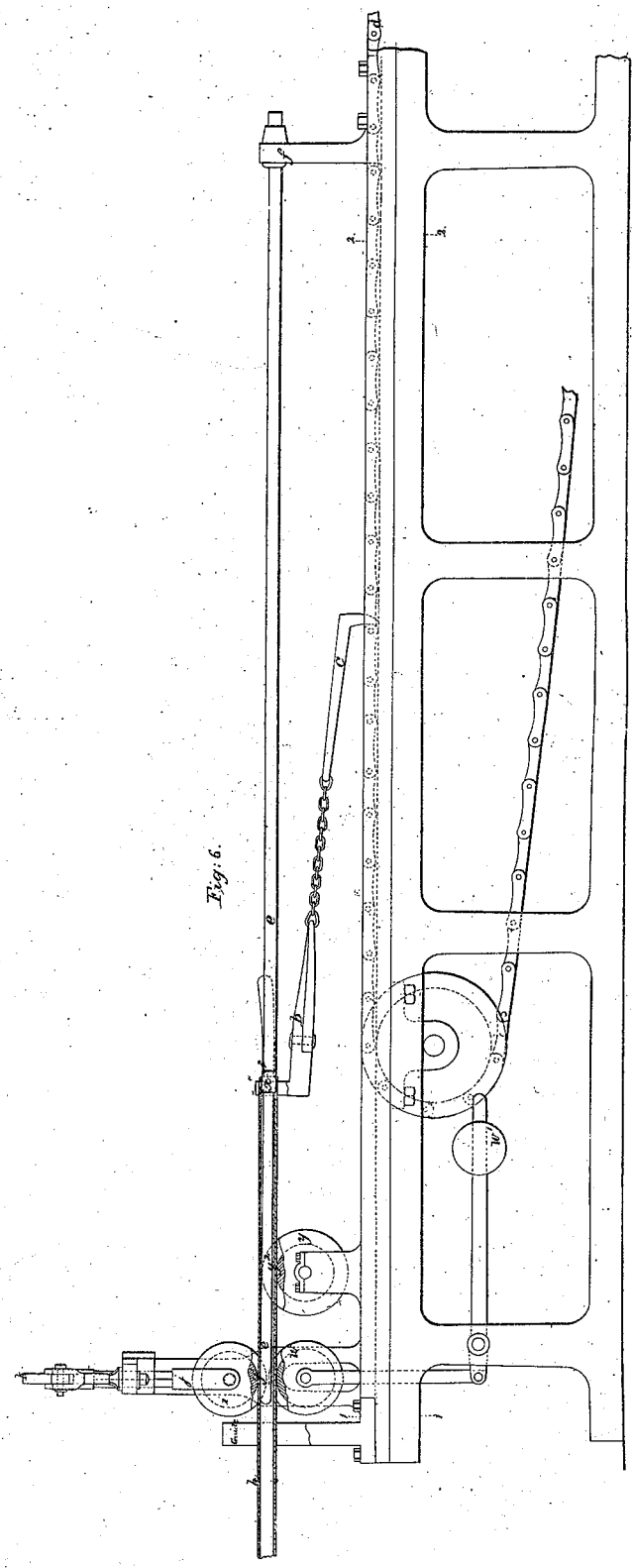

UNITED STATES PATENT OFFICE.

THOMAS H. RUSSELL, OF WEDNESBURY, ENGLAND.

WELDING IRON TUBES.

Specification of Letters Patent No. 4,992, dated March 6, 1847.

*To all whom it may concern:*

Be it known that I, THOMAS HENRY RUSSELL, a subject of the Queen of Great Britain, and now residing at Wednesbury, in the county of Stafford, England, tube manufacturer, have invented or discovered new and useful Improvements in the Manufacture of Welded Iron Tubes; and I, the said THOMAS HENRY RUSSELL, do hereby declare that the nature of my said invention and the manner in which the same is to be performed are fully described and ascertained in and by the following specification and accompanying drawings, letters, figures, and reference marked thereon, that is to say—

Figure 1 shows a side view of machinery arranged to work according to my invention. Fig. 2 is a plan of the same; Fig. 3 a longitudinal section thereof. In these figures the full length of the draw bench employed is not shown but only the two ends thereof. Fig. 4 is a transverse section of the machinery.

And in order that the peculiar character of this invention may be fully understood it is deemed desirable at once to state that a stationary bar or what I call a beak iron is used alone to give the requisite internal support to a tube at the seam when the tube at the seam or joint is being acted on externally by mechanical pressure or force so as to weld the edges or parts together the beak iron offering the requisite support by its resisting the external pressure or force used to produce the weld by the stem of the beak iron being of such strength as to prevent its bending to any prejudicial extent it being the power of the stem to resist bending which offers the requisite support to the interior of the seam when welding by external mechanical pressure or force. Heretofore when welding iron tubes external support has been used to sustain the enlarged head or bulb constituting the mandrel or instrument employed, and either made to fill the whole interior circumference of the tube which has then been the means of keeping the tube open, or else the mandrel has only nearly filled the circumference and in cases where it has not quite filled the circumference of the bore it has been so placed that the bulb or enlarged head has simply been permitted to lie within the tube and the instrument has not been so fixed and used as to obtain the requisite internal support for producing the weld by the internal instrument resisting to bend or be deflected out of its straight line which is the case according to my present invention and which according to my mode of working is necessary to effect the object desired for without this the two forces above and below tend to spread open the tube and thus prevent the weld.

The novelty and extent of my invention does not consist in the simple circumstance of having a stationary bar or tool such as herein mentioned but the invention consists of combining with the beak made to resist the pressure necessary for welding when this is combined with the use of suitable mechanical apparatus (such as is hereinafter described for producing the requisite external pressure or force for welding the edges of the tube.

In the various figures of the drawings the same letters of reference are used to indicate similar parts, *a a* being the framing of the draw bench which is of an ordinary construction and I believe is the best means of moving an iron tube through the process.

*b* are the keys or forceps for holding the tube and *c* is the hook which connects the tongs *b* to the chain *d* of the draw bench.

*e* is a bar which I call a beak iron. This bar *e* is steeled on its working surface at *e'* and is keyed into the fixed head *f* and it is by its strength to resist flexure that sufficient internal support is offered to a tube placed thereon so as to have the seam of the tube welded by mechanical pressure or force brought to act externally on the tube.

*g* is a hollow shelf or surface fixed to the draw bench on which the tube to be welded is supported at its under part in such manner that the joint or seam does not rest on the stem of the beak iron. *h* is an iron tube (placed upon the beak iron at a welding heat) the edges of which overlap so as to produce what is called a lap joint, and in order to keep the length of the beak iron as short as possible I prefer to weld the tube first about one half thereof and then to weld the other part but it will be evident that the larger the diameter of the tube the longer may the beak iron be (in consequence of its increased section) and not be liable to bend by the pressure or force used without offering sufficient resistance so as to produce the weld to the seam of the tube. *i* is a grooved roller which with the apparatus connected therewith I consider the best means of obtaining the requisite mechanical pressure externally for accomplishing the weld. This roller is mounted in a forked sliding bar *j* and at its upper end the bar is connected to the lever *k* as is shown so that the lever being pressed on by the workman produces sufficient pressure on the surface of the tube to weld the seam thereof as the tube is drawn along the beak iron under the roller *i*.

In welding iron tubes by means of the machinery and apparatus herein described the workman having heated one end (to somewhat more than half its length) of a properly prepared tube to a welding heat he draws the same from the furnace and then by the aid of a boy or boys places the heated tube on to the beak iron as is shown in the drawing and then causes the roller *i* to descend and to press on the parts or edges which overlap so that they are pressed between the roller and the beak iron as the tube is drawn along by the chain of the draw bench. And I would remark that other mechanical equivalents for obtaining the requisite pressure or force for producing the weld may be resorted to and variations may be made in other parts of the machinery and apparatus without departing from my invention so long as the peculiar character of it as herein shown and described is retained. The machinery above specified is suitable for making the larger diameters of tubes according to my invention in which case the length of the bar or beak iron *e* may be considerable and yet offer sufficient stiffness or resistance to flexure but as it is desirable to weld iron tubes of smaller diameter where the stem of the beak iron would not be of sufficient diameter to offer stiffness against bending if only supported at the end I in such cases give the beak iron support near to the point where the pressure is brought upon it by which means the length of the stem of the beak iron may be made much greater than when only fixed at one end.

Figure 5 shows a plan and Fig. 6 is side view of part of a draw bench and apparatus for welding iron tubes according to my invention. In this instance the tubes in being welded are drawn on to the beak iron directly from the furnace and I prefer (as in the former case) that the weld should be first performed on the one half of the tube and then on the other half.

In using this apparatus the tongues *b* embrace the outer end of the tube there being a hollow cone *x* introduced into the tube to prevent its being crushed as has heretofore been practised. *e* is the beak iron with its stem. This bar *e* should be of as large diameter as the diameter of the tube will admit and yet allow of the tube moving freely on all parts. *w* is a grooved roller which supports the under surface of the tube.

The apparatus for producing the external pressure for welding is similar to that before described. And as the beak iron from its great length compared with its diameter would be liable to bend if only supported at *f* I apply a grooved roller *y* to support the under surface of the tube in such manner that the bar *e* resting on the lower part of the interior of the tube the beak iron *e* will be upheld by the roller *y* and be the better able to resist the pressure at *y'*. In fact it will be the length of the bar *e* between the points *y'* and $y^2$ which will be the beak iron which resists by its stiffness the pressure or force applied externally.

It will be seen that the roller *w* is mounted in a frame which frame with its roller is pressed upward by the weights *w'* the object being to allow the roller to descend rather than that the pressure on the beak iron at *y'* should cause the beak iron to descend and press on the lower part of the interior of the tube.

I should here state that in the above description I have described the use of a draw bench as the means of moving the tubes through the process because I believe such to be the best mode of carrying out my invention but at the same time it will be evident that the movement of the tube might be by rollers or other machinery. The tubes having been welded as above explained I cause them to draw when in a heated state through a pair of tongs or dies such as have been heretofore used in order to finish the external shape of the tubes.

Having thus explained the nature of my invention that which I claim is as follows, viz:

I claim the pressure roller (*i*) which makes pressure on the lap joint for welding in combination with the beak (*e*) that resists the pressure of the roller (*i*) when this beak is made of less diameter than the inside of the tube, and bent upward to sustain the lap joint under the roller (*i*) substantially as described, whether it be sustained by its attachment at the other end alone or by the under rollers (*v*) and (*w*) as described and placed between the point of the beak and its attachment.

In testimony whereof I have hereto set my signature this twenty-sixth day of May in the year of our Lord one thousand eight hundred and forty six.

T. H. RUSSELL.

Witnesses:
   JOHN G. UNDERHILL,
   JOHN CADLY.